United States Patent [19]
Stock

[11] 3,727,880
[45] Apr. 17, 1973

[54] VALVE
[75] Inventor: Arthur J. Stock, Lakewood, Ohio
[73] Assignee: Stock Equipment Company, Cleveland, Ohio
[22] Filed: Dec. 22, 1970
[21] Appl. No.: 100,588

Related U.S. Application Data

[63] Continuation-in-part of Ser. No. 847,380, Aug. 4, 1969, abandoned.

[52] U.S. Cl. .....................251/85, 137/72, 251/333, 251/58
[51] Int. Cl............................................F16k 25/00
[58] Field of Search....................137/527, 72, 527.4; 251/174, 84, 85, 299, 86, 332, 333, 83, 87, 176, 177, 178, 179, 298, 303, 228, 58

[56] References Cited

UNITED STATES PATENTS

| | | | |
|---|---|---|---|
| 3,346,234 | 10/1967 | Allen | 251/174 |
| 3,182,951 | 5/1965 | Spencer | 137/527.4 X |
| 932,494 | 8/1909 | Reeves | 251/85 |
| 2,247,773 | 7/1941 | Dunn | 251/85 X |
| 2,744,539 | 5/1956 | Jones | 137/527.4 |
| 141,747 | 8/1873 | Armstrong et al | 251/299 |
| 1,714,182 | 5/1929 | McNulty | 251/299 X |
| 2,165,640 | 7/1939 | Marx | 251/86 X |
| 2,835,269 | 5/1958 | Seymour | 251/332 X |
| 3,131,906 | 5/1964 | King | 251/332 X |
| 3,331,391 | 7/1967 | Merdinyan | 137/527 |

Primary Examiner—Henry T. Klinksiek
Attorney—Bosworth, Sessions, Herrstrom & Cain

[57] ABSTRACT

A valve for controlling flow to a burner of pulverized coal and air mixture in which valve has a body with an opening surrounded by an auxiliary metal valve seat portion and an annular sealing gasket formed of resilient material such as natural or synthetic rubber that can deteriorate under extraordinary conditions such as heat or explosion. A generally flat gate plate positioned within the valve body is mounted on a movable supporting member so it can be moved from an open position to a closed position in which it contacts the gasket or the auxiliary seat portion to seal the valve opening. The gate plate is movably mounted on the supporting member so it can tilt, within limits, relative to the supporting member to reduce scuffing of the gasket on opening or closing of the valve, and so it is resiliently urged away from the supporting member toward the valve opening when the member is in closed position to hold the gate plate in contact with the gasket or with the metal seat portion if the gasket is inoperative or absent due to deterioration. The supporting member is pivotally mounted and is moved by pivotally connected link members that are in an over-the-center position when the valve is closed, to hold the gate plate closed even if the actuating means becomes inoperative when the valve is closed.

13 Claims, 7 Drawing Figures

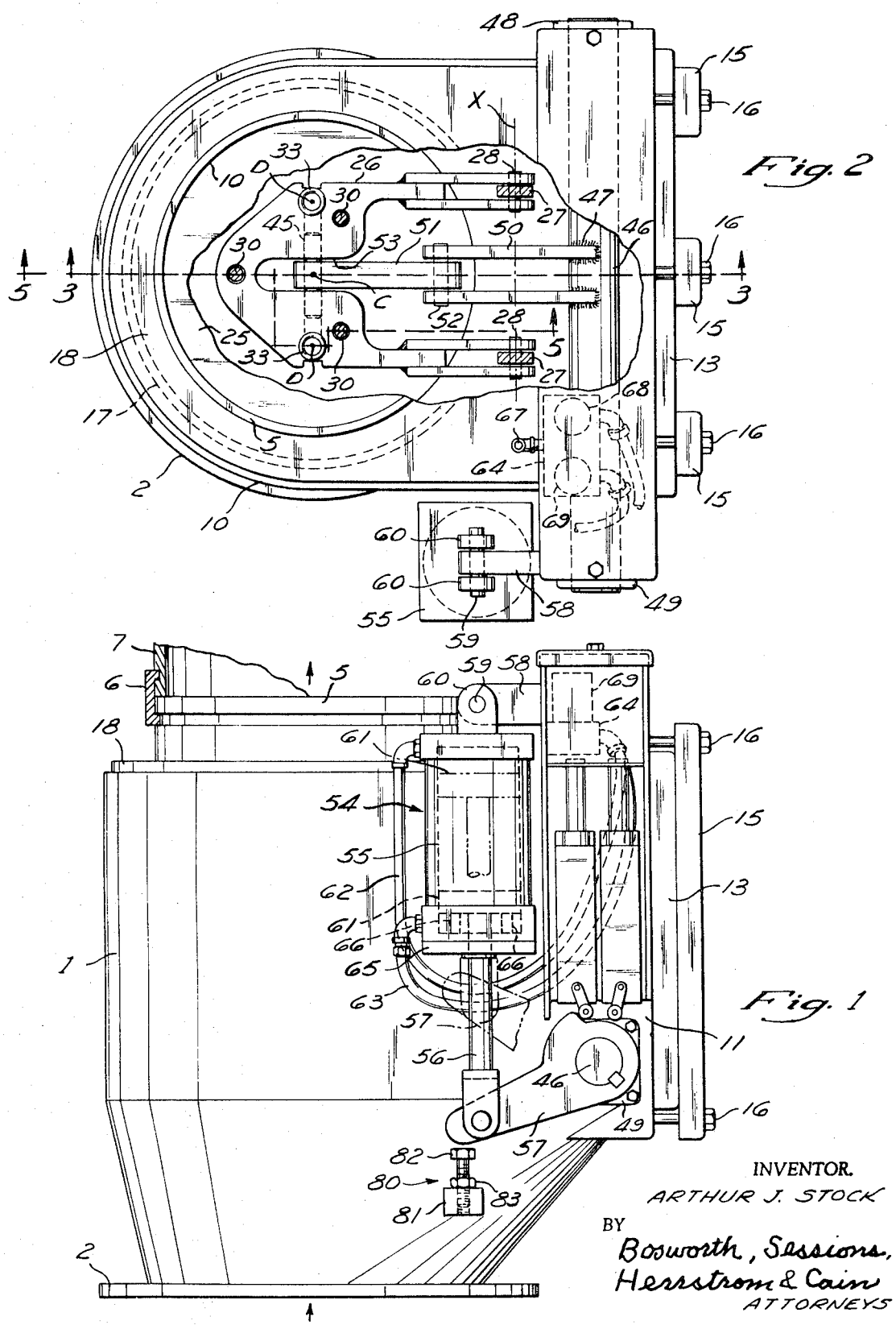

INVENTOR.
ARTHUR J. STOCK

VALVE

CROSS REFERENCE TO RELATED APPLICATION

This application is a continuation-in-part of application Ser. No. 847,380, filed Aug. 4, 1969 by applicant and now abandoned.

BACKGROUND OF THE INVENTION

This invention relates to a valve, and more particularly to a gate valve having safety features.

For convenience the present invention will be described in connection with a valve for controlling the flow of pulverized coal and air mixture to a boiler furnace, as in an electrical generating plant, since it provides particular advantages in such use, although it may be advantageously employed in other valves.

A mixture of pulverized coal and air is usually supplied to the boiler furnace through a burner line connected by a valve to a pulverizing mill. The coal and air mixture supplied to the furnaces is quite flammable; thus there is a possibility that fires or explosions can occur in the mill or in the burner line.

Prior valves for connecting the pulverizing mill to the burner mill have not been completely effective in the event of fire or explosion to isolate the mill from the burner line to prevent fire from spreading. Some of the valves utilize a flat gate plate in contact with a gasket around the valve seat to seal the valve opening. These gaskets may be damaged or destroyed by the fire or explosion, with the result that the valve is not effectively closed. Since the boiler furnace sometimes is under vacuum and sometimes under superatmospheric pressure, the pressure conditions may be such that heat will be blown back to the valve and destroy the gasket. Moreover, on opening or closing considerable scuffing, and hence wear, of the gasket may occur. Furthermore, it is desirable that the valve stay closed in the event of failure of power actuating means while the valve is closed, to prevent undesired feeding of fuel.

SUMMARY OF THE INVENTION

It is therefore an object of the present invention to provide a gate valve of improved construction that has safety features rendering it substantially explosion and fire proof. Another object is the provision of a gate valve that will provide an effective seal if a sealing gasket is destroyed. A further object is to provide a resiliently mounted closure gate plate for a gate valve. Another object is to provide an improved gate valve in which a gate closure plate is resiliently and tiltably mounted on a supporting member that moves the gate plate between open and closed positions.

The valve contemplated by this invention comprises a valve body having an opening surrounded by an auxiliary metal valve seat portion and an associated annular resilient gasket that acts as the primary valve seat. A remotely operated, removable, flat gate plate is mounted within the valve body on a supporting member that moves the gate plate between an open position and a closed position wherein it contacts the gasket to seal the valve opening surrounded by the valve seats. Resilient means operating between the supporting member and the gate plate urges it against the gasket to form a good seal when the member is in closed position, and also urge the gate plate against the metal valve seat to form an adequate seal if the gasket should be inoperative or absent because of deterioration as by explosion or fire. Moreover, the gate plate is tiltably mounted on the supporting member to reduce scuffing of the gate plate or the gasket as the valve is opened and closed. Furthermore, means are provided to maintain the valve closed if the power means for actuating the valve becomes inoperative while the valve is closed.

BRIEF DESCRIPTION OF THE DRAWINGS

These and other objects and features of the invention will become apparent from the following description of a preferred embodiment of the invention, in conjunction with the accompanying drawings in which:

FIG. 1 is a side elevation of a valve according to this invention;

FIG. 2 is a top plan, with portions broken away, of the valve of FIG. 1;

DESCRIPTION OF THE PREFERRED EMBODIMENT

Figure 3:
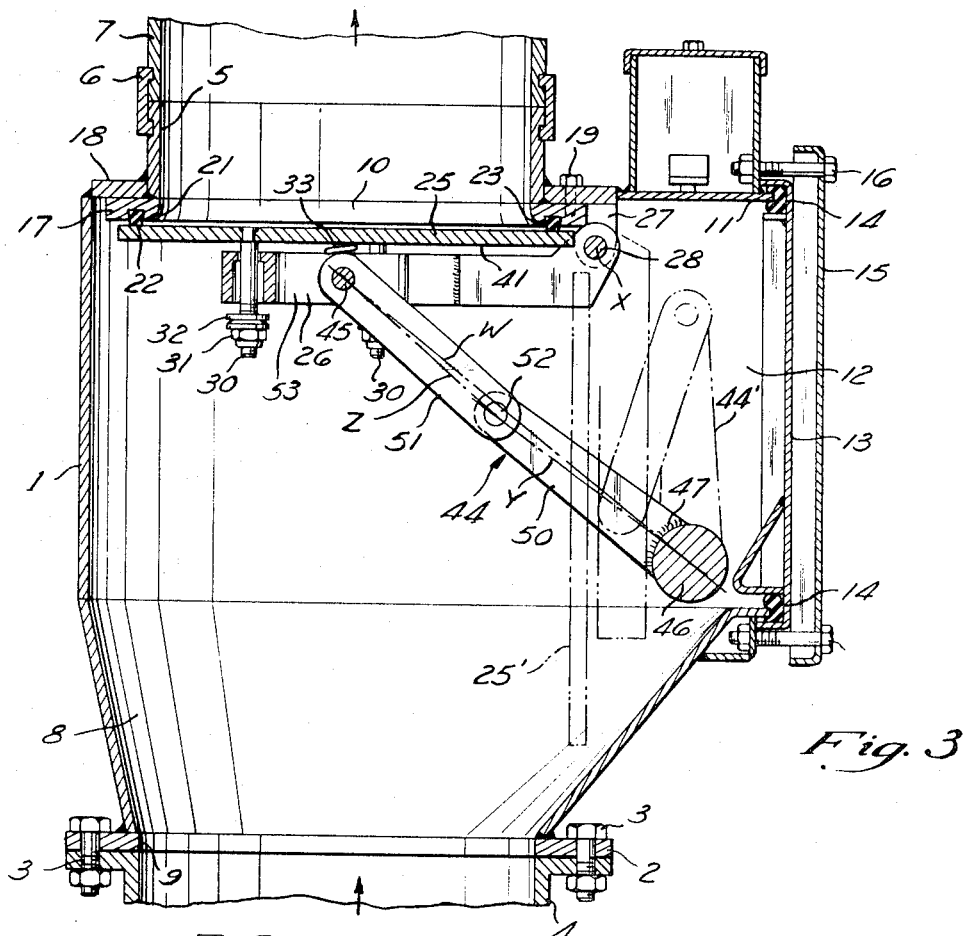
FIG. 3 is a cross section taken along the line 3—3 of FIG. 2.

In the drawings, numeral 1 designates a valve body having at one end a flange 2 attached by bolts 3 to an outlet conduit of a coal pulverizer 4, and at its other end a collar 5 connected by coupling 6 to a burner fuel line 7 of a conventional boiler furnace. The hollow interior 8 of the valve body provides flow passages extending between lower circular cross section opening 9 defined by flange 2 and upper circular cross section opening 10 defined by collar 5, the flow being in the direction indicated by the arrows in FIGS. 1 and 3 when the valve is open.

To provide access to the interior of the valve body 1, one side 11 of the body has an opening 12. During normal operation, opening 12 is closed by a cover 13 having on its interior an annular sealing gasket 14 engaging the wall of opening 12 and sealing it against egress of any coal and air mixture or other fluid passing through the valve. The cover is held in place by retaining members 15 secured to body 1 by nut and bolt assemblies 16.

To provide valve seat means that may be selected to shut off flow of pulverized coal and air through the valve, the collar 5 has a radial flange 17 extending outwardly from the collar. Flange 17 is located on the inside of valve body 1 adjacent its end wall 18 and is secured to the end wall by conventional means such as screws 19. The flange is formed as a continuation of collar 5 and is joined to the collar by an inner radiused portion 21, thereby providing a smooth passage for flow of pulverized coal and air through valve opening 10.

An annular sealing gasket 22 of suitable flexible resilient material such as synthetic rubber is secured in an annular groove 23 formed in flange 17; gasket 22 may be retained within groove 23 by any conventional means; thus, for example, the gasket and groove may be wedge-shaped. The gasket is of sufficient height to extend a short distance beyond the bottom surface 24 of flange 17. The surface 24 is shaped to form an auxiliary valve seat for a purpose described below; in the illustrated embodiment it is flat and smooth. The above described valve seat means is stationary in the illustrated embodiment.

To close the valve opening 10, a movable closure means or member, taking the form in the illustrated valve of a flat generally circular gate plate 25, is provided. The plate 25 is of sufficient size to extend radially outwardly for a substantial distance beyond gasket 22, and is adapted to be brought into contact with the gasket 22 to close and seal opening 10. Gate plate 25 is movable between its maximum closed position as shown in full lines in FIG. 3, to its maximum open position as shown in phantom lines 25' in FIG. 3 in which the valve opening 10 is substantially completely unobstructed. It is pivotally mounted on a hinged supporting member 26, rotatably supported by brackets 27 (FIG. 3) that depend inwardly from end wall 18 of the valve body. Pins 28 (FIGS. 2 and 3) rotatably mount member 26 on brackets 27.

Gate plate 25 is also movably mounted on supporting member 26 by a plurality of pins 30 (FIGS. 1, 3, 5–7), each having a head or adjustable nut 31 and tiltably supported washer 32, and by a plurality of compression springs 33 (FIGS. 1, 5–7). In the illustrated embodiment three pins 30 and two springs 33 are utilized and arranged to support the gate plate in balanced relation from member 26, but other numbers of pins and springs may be used, provided that the pins and springs provide balanced support for plate 25 and are sufficient to force the gate plate into sealing contact with the valve seat and to make possible the desired limited tilting of plate 25 relative to supporting member 26.

Figure 6:
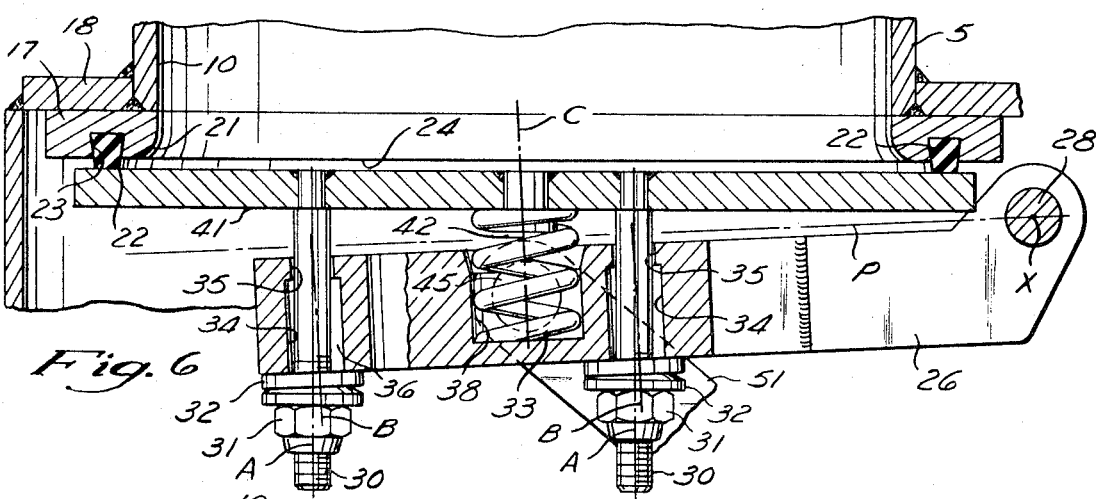
FIG. 6 is a cross section to the same scale as FIG. 5 of the same portion of the valve, showing how the gate plate can tilt relative to its support on opening or closing.
Figure 7:
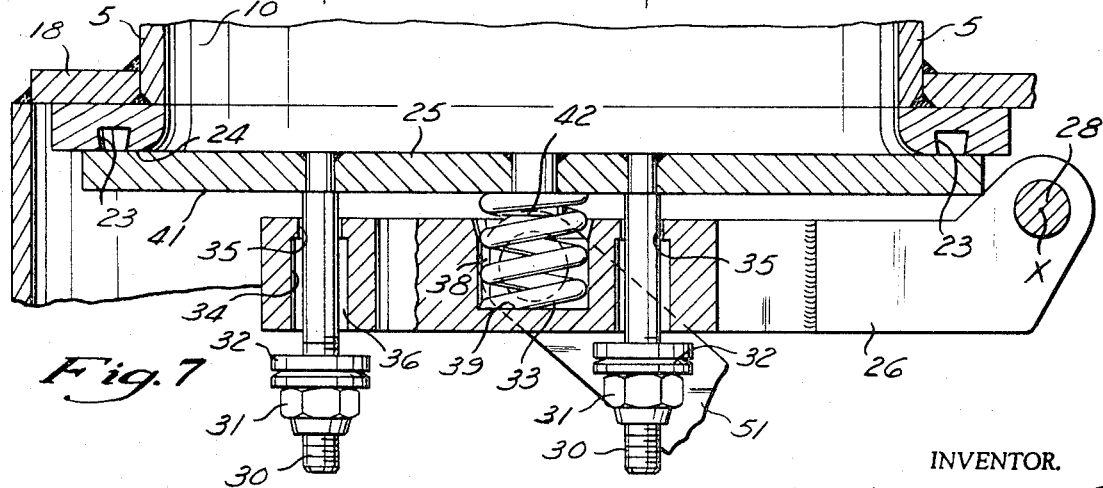
FIG. 7 is a cross section to the same scale as FIG. 5 of the same portion of the valve showing how the gate plate closes the discharge opening of the valve even if the gasket is missing.

Each pin 30 is fixed as by welding to, and projects from the bottom of, gate plate 25. The pins are preferably normal to the bottom of, and equidistantly and equiangularly spaced around the center of, plate 25 with their axes A parallel. Each pin 30 extends through a recess 34 in supporting member 26, the axes B of the recesses 34 being spaced to accept pins 30 and equiangularly and equidistantly spaced from and parallel to an axis C (FIGS. 2 and 6) on member 26 that is spaced from and normal to a plane P passing through pivot axis X of member 26. The axes B are also symmetrically arranged relative to axis X. Each recess 34 is shaped to permit the pin 30 in it to tilt in the recess while the axes A of the pins substantially intersect the axes B of their recesses at substantially the same distance relative to the plane passing through the pivot axis X of member 26. For this purpose, in the illustrated valve, each recess 34 has a portion 35 only slightly larger in diameter than its pin 30 at the side of member 26 nearest gate plate 25, and a remaining portion 36 considerably larger in diameter than the pin, to permit the pin to tilt relative to the axis of the recess as shown in FIG. 6. The pins therefore at all times locate plate 25 in balanced relation on member 26.

In the illustrated embodiment there are two coil compression springs 33 in recesses 38 in member 26, the axes D of these recesses being parallel to axis C and equidistant from Axis X. Each recess 38 is sized to fit the spring closely but slidably; it opens toward gate plate 25 and has a bottom 39 against which one end of the spring bears. The other end of each spring bears against gate plate 25, and is located against lateral movement therein by a boss 42 projecting from the underside 41 of plate 25 inside spring 33; the spring bears against plate 25 at locations equidistant from the center of plate 25 and lying along an axis that passes through the center of the plate and is parallel to axis X, to exert balanced force on plate 25. Each spring 33 urges the plate 25 toward the opening 10, thereby aiding in providing a movable resilient support for plate 25 on member 26 and forcing plate 25 into close contact with gasket 22 to seal opening 10 when supporting member 26 is at or near its closed position.

Member 26 carrying plate 25, is moved by toggle assembly 44 between the maximum open position, shown in phantom lines in FIG. 3, and the maximum closed position (FIG. 3) of member 26, wherein the plate 25 is forced into contact with gasket 22. The toggle assembly is pivotally connected to supporting member 26 by a pin 45, and at the other end is fixed to a rotatable operating rod 46 as by welding 47. Partial rotation of rod 46 about its axis moves the toggle assembly between the full line position and phantom line position 44' shown in FIG. 3 to pivot member 28 and plate 25. Operating rod 46 is journaled in bearings 48 and 49 on opposite sides of valve body 1.

Toggle assembly 44 comprises a bifurcated link member 50 one end of which is fixed to the operating rod 46, and the other end of which receives between its forks an end of a single link member 51, the overlapping ends of these link members being pivotally connected by a pin 52. The other end of link member 51 is pivotally connected by pin 45 in slot 53 of supporting member 26. The link members 50 and 51 are so arranged that when member 26 is in the maximum closed position in which the plate 25 is in its closed position, the link members are in, and are maintained in, an over-the-center position in which, as shown in FIG. 3, the connecting pin 52 is displaced slightly past a plane W containing the axes of operating rod 46 and pin 45. In other words, the axis Y of link member 50 extending between the centers of rod 46 and pin 52, and the axis Z of link member 51 extending between the centers of rod 46 and pin 52, are not coincident with an axis in plane W extending between the centers of pin 45 and rod 46, but are inclined so that the center of pin 52 has moved somewhat past the axis between pin 45 and rod 46.

Such over-the-center position, which is made possible by the resiliency of gasket 22 and springs 33, locks the member 26 and gate plate 25 in closed position when the operating rod 46 has been turned to its maximum closing position; the valve then will tend to stay closed until positively opened by turning of rod 46 in the opposite direction. This is an important advantage if the actuating means described below should become inoperative, while the valve is closed, as because of failure of power.

The operating rod 46 is rotated about its axis by a double-acting cylinder and piston mechanism 54 (FIGS. 1 and 4) comprising a cylinder 55 and a piston rod 56 connected to operating rod 46 by an arm 57 fixed on the rod outside of valve body 1. Cylinder 55 is pivotally supported on valve body 1 by a bracket 58 affixed at one end to the valve body and at its other end pivotally connected by pin 59 to trunnions 60 affixed to the cylinder end opposite piston rod 56.

To move the gate plate between its open and closed positions, air is supplied (FIG. 4) to the upper side 61a of the piston 61 through air line 62, and to the underside 61b of the piston 61 through air line 63. The piston 61 is illustrated as an air operated piston, but other pneumatic or hydraulic fluid operated pistons may be utilized, if desired. Flow of air to the cylinder 55 is controlled by a solenoid operated valve 64 to which air lines 62 and 63 are connected.

When the piston is in its lowermost position (FIG. 1) in which plate 25 and the support member 26 are in the valve closed position, the piston 61 bottoms at the rod end 65 of the cylinder to prevent the link members 50 and 51 from moving beyond the desired over-the-center position. Spacers 66 between the underside 61b of piston 61 and the upper side of the cylinder end 65 provide space for power fluid beneath the piston when it is bottomed.

The valve 64 is moved between its respective positions to direct the flow of air from air supply line 67 to either side of piston 61 by solenoid-operated air valves 68 and 69. Solenoid 70 controls the operation of valve 68 and solenoid 71 controls the operation of valve 69. The solenoids 70 and 71 are controlled by a push button (not shown) or other conventional means and suitable electrical circuitry.

Figure 4:
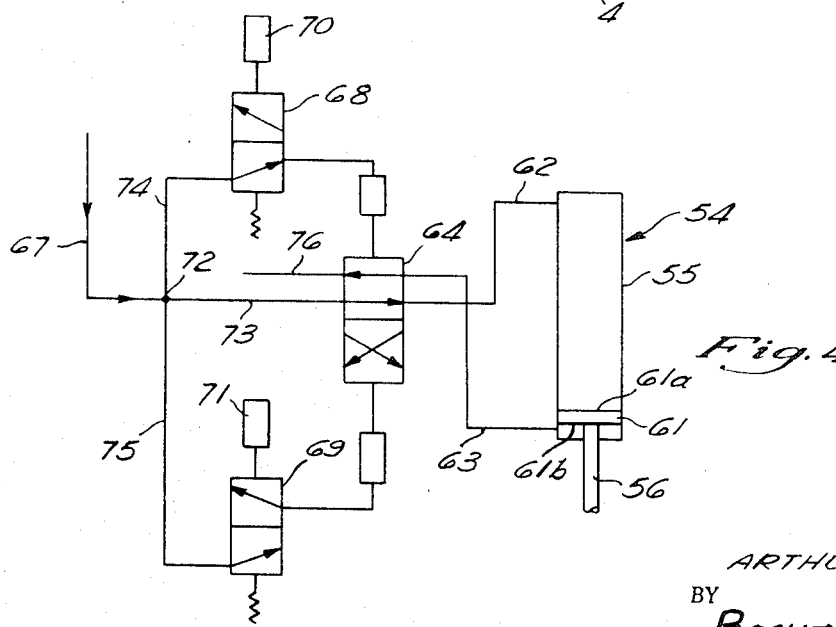
FIG. 4 is a schematic view of the fluid circuitry for operating the valve.
Figure 5:
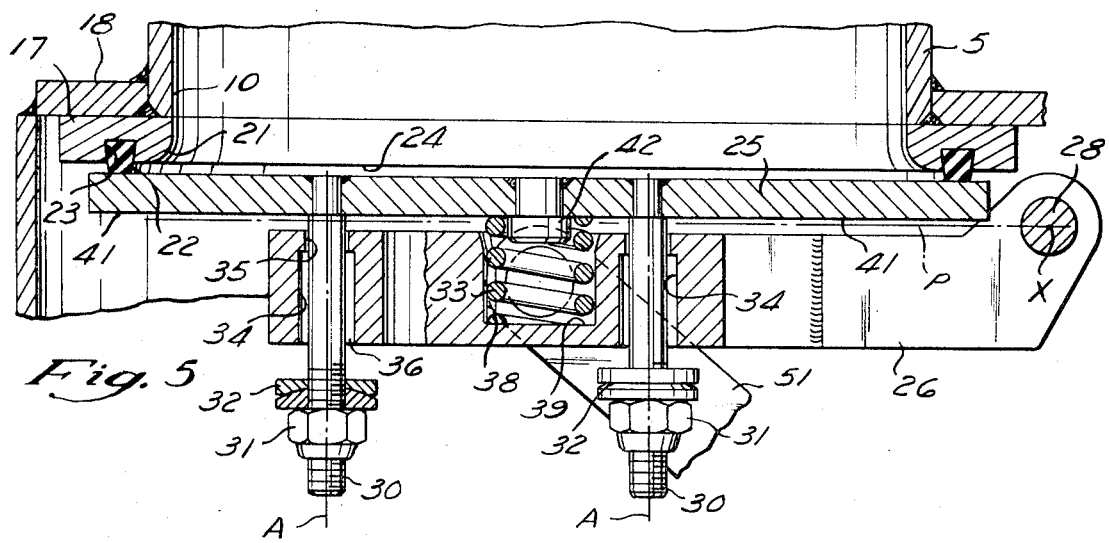
FIG. 5 is a cross section to an enlarged scale along line 5—5 of FIG. 2, of a portion of the valve including the valve opening, gasket, and the gate plate and its support in closed position.

Referring now to the FIG. 4 wherein a schematic illustration of the pneumatic circuitry is illustrated in its position wherein the gate plate 25 is in its closed position, air under suitable pressure is supplied through the air supply line 67 to a distributor 72. Distributor 72 directs the air through air line 73 to the valve 64, through air line 74 to air valve 68 and through air line 75 to air valve 69. The solenoid 70 has moved valve 68 to its open position in order that air will flow through the valve 68 to move the valve 64 to its open position. Thus, air flows through the valve 64 to the upper side 61a of piston 61 to force the piston downwardly thereby moving the piston rod 56 downwardly to rotate the operating rod 46 counterclockwise to its full line position shown in FIG. 3. With the toggle mechanism 44 in this position, the gate plate 25 is in contact with the gasket 22, sealing opening 10. Solenoid 71 has moved valve 69 to its exhaust position thereby preventing flow of air from line 75 through valve 69 and exhausting air from the return side of valve 64. Air from the underside 61b of piston 61 is exhausted through line 63, valve 64 and exhaust line 76.

When it is desired to open the valve opening 10 to the flow of the mixture of pulverized coal and air, suitable electrical controls are actuated in conventional manner to actuate solenoids 70 and 71. Actuation of solenoid 70 moves valve 68 to its exhaust position connecting the return side of valve 64 to exhaust line 76 and actuation of solenoid 71 moves valve 69 to its open position wherein air flows through line 75 through valve 69 to the valve 64 moving it to its alternative position. Movement of valve 64 to its alternative position connects line 63 to air supply line 73 thereby permitting the flow of air to the underside 61b of the piston 61, and connecting line 62 to exhaust 76. Air supplied to the underside 61b of the piston 61 moves the piston rod and piston 61 upwardly to the dotted line position shown in FIG. 1 thereby rotating the control operating rod 46 clockwise to move the toggle mechanism 44 to its phantom line position shown in FIG. 3. Movement of the toggle mechanism 44 to this position pivots the supporting member 26 about pins 30 and moves the supporting member 25 to the phantom line position as illustrated in FIG. 3 thereby opening the valve 1.

With the supporting member 26 in the closed position as shown in FIG. 3, the springs 33 force the gate plate 25 upwardly and into contact with the gasket 22. In the event of deterioration of the gasket 22 as by fire or explosion, the springs 33 force the gate plate 25 upwardly, retaining contact with that portion of the gasket that remains. If the gasket is completely absent, as because it is destroyed, the springs will force the gate plate into contact with the auxiliary valve seat surface 24 of flange 17, thereby continuing to substantially seal the opening 10. Thus a seal is obtained irrespective of the height or existence of the gasket 22.

Furthermore, as is apparent from FIG. 6, the resilient tiltable mounting of the gate plate 25 on supporting member 26 makes it possible for the gate plate to contact the gasket 22 even though supporting member 26 is not in its fully closed position on opening and closing of the valve. This tiltable resilient mounting thus minimizes scuffing action between the gate plate 25 and gasket 22 on opening and closing of the valve, which is important in reducing wear of the gasket because coal particles that may adhere to the gasket or gate plate could cause abrasion and excessive wear of the gasket or the annular metal valve seat if the gasket is absent, or of the gate plate itself, if substantial scuffing occurred. Moreover, the tiltable resilient mounting makes possible better and firmer seating of the valve gate plate on the valve seat, whether the gasket 22 or the auxiliary valve seat 24.

The springs 33 preferably exert enough force to hold the gate plate closed even against a substantial back pressure of several pounds per square inch in opening 10.

The illustrated embodiment also includes a stop 80 (FIG. 1) mounted outside of the valve and adapted to be engaged by the outer end of crank arm 57. Stop 80 comprises a base 81 fixed to the valve, and carrying threaded bolt 82 and locknut 83 to make possible adjustment of the height of the stop relative to the crank arm. The stop provides a safety feature in preventing the toggle link members 50 and 51 from moving so far past the desired over-the-center position that the valve can open, once it is closed, if for any reason the piston does not bottom on the cylinder, as because the cylinder is removed for maintenance or if there should be a breakage of parts.

It can be seen from the foregoing that the valve of this invention will provide a substantial seal irrespective of the condition of the gasket surrounding the valve seat; that the valve may be opened or closed with facility and reduced wear, and that the valve provides great safety.

It should be understood from the foregoing that various modifications may be made in this invention without departing from the scope of the appended claims.

I claim:

1. A valve for controlling the flow of fluent material comprising a valve body having an opening that is to be opened and closed, said valve body being adapted to have said material flow therethrough when said opening is open; valve seat means on said body surrounding said opening; gate closure means in said valve body adapted to close said opening; movable supporting means for said closure means pivotally mounted in said valve body about an axis parallel to a plane in which said valve seat means lies, said supporting means being adapted to move said closure means bodily through an arcuate path between a valve closed position in which said closure means extends across said opening to close said opening and a valve open position in which said closure means is away from said opening so said opening is unobstructed; and means tiltably mounting said closure means on said supporting means so that said closure means contacts said valve seat means in sealing relation even though said supporting member is not in its maximum valve closed position, said means tiltably mounting said closure means on said supporting means comprising a plurality of pins located substantially equiangularly and equidistantly around the center of said closure means with two of said pins equidistant from the axis about which said supporting means is pivoted, and a plurality of springs operating between said supporting means and said closure means for urging said closure means into contact with said valve seat means when said supporting means is in its valve closed position, said springs being located to exert balanced forces on said closure means by bearing against said closure means along an axis that passes through the center of said closure means and is parallel to the axis about which said supporting means is pivoted.

2. The apparatus of claim 1 in which said pins are fixed to said closure means and extend away from said opening in said valve body, which pins extend into corresponding openings in said supporting means, said openings being large enough to permit said pins to tilt in said openings.

3. The apparatus of claim 2 in which said pins and their corresponding openings are so related that the axes of the pins substantially intersect the axes of said openings in said supporting means when said pins tilt in said openings.

4. The apparatus of claim 3 in which said pins and their corresponding openings in said supporting means are located to support said closure means in balanced relation on said supporting means.

5. The apparatus of claim 1 in which said springs are coil springs spaced from said pins.

6. The apparatus of claim 1 in which said means tiltably mounting said closure means on said supporting means supports said closure means so that it contacts said valve seat means entirely around said valve seat means with substantially no relative lateral movement between said closure means and valve seat means as said supporting means moves toward and away from its valve closed position.

7. The apparatus of claim 1 in which said valve body opening and said closure means are of circular cross sections.

8. A valve for controlling the flow of fluent material comprising a valve body of metal having an opening that is to be opened and closed and adapted to have material flow therethrough when said valve is open, said opening being surrounded by a metal auxiliary valve sleeve seat on said valve body; a gasket on said valve surrounding said opening and forming a primary valve seat, said gasket being formed of resilient material subject to deterioration and projecting beyond said auxiliary valve seat; movable gate closure means in said valve body adapted to close said opening and to overlap both said primary and said auxiliary valve seats; movable supporting means for said closure means pivotally mounted in said valve body about an axis for moving said closure means bodily through an arcuate path between a valve closed position in which said closure means extends across said opening to close said opening and a valve open position in which said closure means is located away from said opening to open said opening; means tiltably supporting said closure means on said supporting means so said closure means contacts one of said valve seats in sealing relation even though said supporting means is not in its maximum valve closed position, comprising at least three pins fixed to said closure means and extending into oversize recesses in said supporting means to permit tilting, said pins being arranged equiangularly and equidistantly around the center of said closure means and symmetrically with respect to the axis about which said supporting means is pivoted, and resilient means operating between said supporting means and said closure means when said supporting means is in valve closed position to urge said closure means into contact with said gasket when said gasket is present and into contact with said auxiliary valve seat when said gasket is not present, said resilient means comprising a plurality of springs symmetrically arranged with respect to the pivot axis about which the supporting means is pivoted and with respect to the center of the closure means; and means for moving said supporting means between its valve closed and valve open positions comprising a link member pivotally connected at one end to said supporting means about an axis parallel to the axis about which said supporting means is pivotally supported, a second link member pivotally connected to said first mentioned link member about an axis parallel to said first mentioned axis, and means pivotally supporting said second link member about an axis spaced from said connecting axis and parallel to said first mentioned axis.

9. The apparatus of claim 8 in which said link members are arranged in an over-the-center position when said supporting means is in its maximum valve closed position.

10. The apparatus of claim 9 comprising actuating means for pivotally moving said second link member to move said supporting means between valve open and valve closed positions, and means for limiting movement of said link members beyond a preset over-thecenter position to prevent said link members from moving said supporting means to valve opening position when said actuating means is not actuated.

11. The apparatus of claim 8 in which said springs are coil springs spaced from said pins.

12. The apparatus of claim 8 in which said means tiltably mounting said closure means on said supporting means supports said closure means so that it contacts said gasket entirely around said gasket with substantially no relative lateral movement between said closure means and said gasket as said supporting means moves toward and away from its valve closed position.

13. The apparatus of claim 8 in which said valve body opening and said closure means are circular in cross sections.

* * * * *